United States Patent [19]
Eakins

[11] Patent Number: 6,053,765
[45] Date of Patent: Apr. 25, 2000

[54] ELECTRICAL CONNECTOR INCORPORATING A LIGHT

[75] Inventor: Bert William Eakins, Ortonville, Mich.

[73] Assignee: Lear Automotive Dearborn, Inc., Southfield, Mich.

[21] Appl. No.: 09/173,816

[22] Filed: Oct. 16, 1998

[51] Int. Cl.[7] .............................. H01R 13/73; H02B 1/01
[52] U.S. Cl. ........................................... 439/557; 439/918
[58] Field of Search ................................... 439/918, 490, 439/557, 558, 354, 356

[56] References Cited

U.S. PATENT DOCUMENTS

| | | | |
|---|---|---|---|
| 4,118,690 | 10/1978 | Paynton | 340/656 |
| 5,507,666 | 4/1996 | Yamanashi | 439/354 |
| 5,885,100 | 3/1999 | Talend | 439/490 |

*Primary Examiner*—Khiem Nguyen
*Assistant Examiner*—Javaid Nasri
*Attorney, Agent, or Firm*—MacMillan, Sobanski & Todd, LLC

[57] ABSTRACT

A light emitting electrical connector is disclosed that includes an electrical circuit, which is secured to a housing of the electrical connector, having a light emitting source and a resistor. In a preferred embodiment, the housing includes a terminal connecting portion for providing electrical power to the electrical circuit, which is molded to the housing of the electrical connector. Preferably, the electrical circuit includes a light emitting diode as the light emitting source. The housing further includes a mounting structure for securing the housing to a surface. In a most preferred embodiment, the mounting structure comprises at least two snap fit tabs for mounting the electrical connector to the surface.

3 Claims, 3 Drawing Sheets

ELECTRICAL CONNECTOR INCORPORATING A LIGHT

BACKGROUND OF THE INVENTION

This invention relates generally to an electrical connector that includes a light emitting source incorporated into the electrical connector.

In many locations within a vehicle there is a need to provide illumination to a discrete area. Examples of such locations include ashtrays, glove boxes, consoles, instrument panels, vanity mirrors, and other areas of the vehicle. In prior systems, illumination of these areas has been accomplished by mounting an incandescent light bulb in the area to be illuminated. The prior system requires a light bulb socket and mounting hardware for the socket. In addition, the socket is wired to a first electrical connector, which is subsequently connected to a second electrical connector to provide power to the light bulb socket. The required mounting hardware and number of connections makes it a time consuming task to install the light. In addition, many of the electrical connections in these systems are crimped connections, which may lower the reliability of the system. Finally, the cumulative power consumption of these many incandescent light bulbs can be significant.

Thus, it is desirable to provide a universal structure that can be used to illuminate discrete areas of a vehicle while reducing the assembly costs and increasing the reliability of the illumination system. In addition, it is desirable to provide a structure that can be flexibly incorporated into new areas of a vehicle without significant redesigning of the area.

The present invention provides a source of illumination that has a lower power consumption and that is mounted within an electrical connector. The electrical connector includes a mounting structure that permits it to be mounted directly to a hole in a vehicle wall and a portion of the electrical circuit for the light is secured to the connector. Thus the present invention reduces the complexity of the connections and the assembly time required to provide illumination for a portion of a vehicle. The present invention provides an illuminated connector that can easily be incorporated into an existing design without a need to redesign the area to be illuminated.

SUMMARY OF THE INVENTION

In general terms, this invention provides an electrical connector that incorporates a light source within the electrical connector itself and the electrical connector is mountable to a vehicle wall.

Essentially, the present invention allows a light to be positioned in a small space in a vehicle. The present invention only requires an aperture in a vehicle wall to mount the electrical connector. A simple electrical connection is all that is required to supply power to the light. Thus, the complexity of the prior art light system is greatly reduced.

In a preferred embodiment a light emitting electrical connector of the present invention comprises a housing having a first terminal portion and a mounting structure. The mounting structure is designed to secure the housing to a surface and the first terminal portion is mateable with a second terminal portion of a second electrical connector. An electrical circuit including a light emitting source and a resistor are mounted to the housing. In a preferred embodiment, the electrical circuit is either insert molded or plated to a portion of the electrical connector. Preferably the light emitting source is a light emitting diode. In a most preferred embodiment, the mounting structure comprises at least two resilient snap fit tabs each of which extends from the housing and includes a wedge-shaped engaging surface. The wedge-shaped engaging surface is designed to engage the surface that the housing is mounted to.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
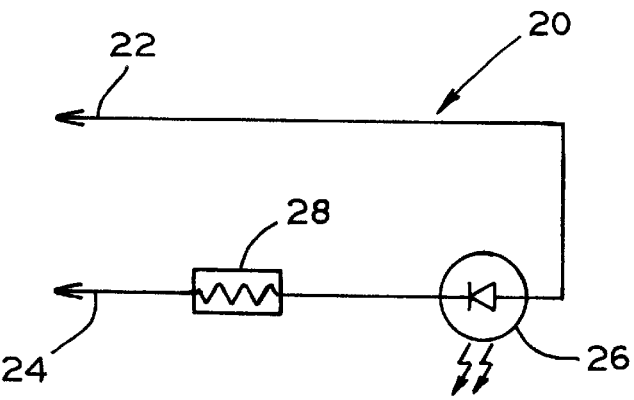
FIG. 1 is a schematic diagram of an electrical circuit of the present invention.

A schematic diagram of an electrical circuit of the present invention is generally indicated at 20 in FIG. 1. Electrical circuit 20 includes an electrical input 22 and an electrical output 24. A light emitting source 26 and a resistor 28 are incorporated in electrical circuit 20. As will be understood by one having ordinary skill in the art, electrical circuit 20 may include other components in addition to light emitting source 26 and resistor 28. For simplicity sake, electrical circuit 20 is shown only including light emitting source 26 and resistor 28.

Figure 2A:
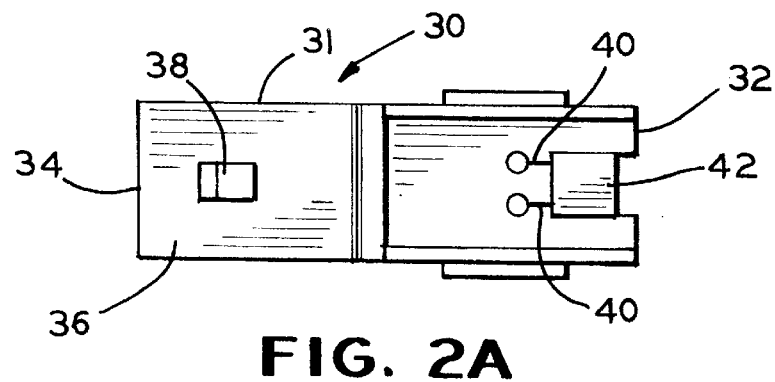
FIG. 2A is a top plan view of one embodiment of an electrical connector designed according to the present invention.

FIG. 2A is a top plan view of one embodiment of an electrical connector designed according to the present invention shown generally at 30. Electrical connector 30 has a housing 31 with a first end 32 and a second end 34. A first terminal portion 36 is located adjacent second end 34 of housing 31. A first latching member 38 is mounted on first terminal portion 36. A light emitting source 42 is mounted adjacent first end 32 and is connected to a plurality of electrical lines 40. As shown in FIG. 2A first latching member 38 can comprise a boss.

Figure 2B:
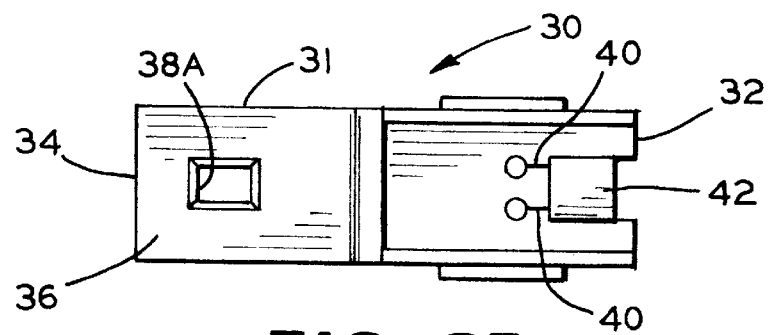
FIG. 2B is a top plan view of another embodiment of an electrical connector designed according to the present invention.

FIG. 2B is a top plan view of another embodiment of electrical connector 30 designed according to the present invention. Common structures between FIG. 2A and FIG. 2B are designated by the same reference numerals. The electrical connector 30 shown in FIG. 2B differs from electrical connector 30, shown in FIG. 2A, only in the structure of first latching member 38A. First latching member 38A comprises a hole in terminal portion 36 in the embodiment shown in FIG. 2B. Preferably, first latching member 38 comprises a hole, as shown in FIG. 2B, such a design permits easier assembly of the electrical connector 30 with a second electrical connector 60 (see FIG. 8C).

Figure 3:
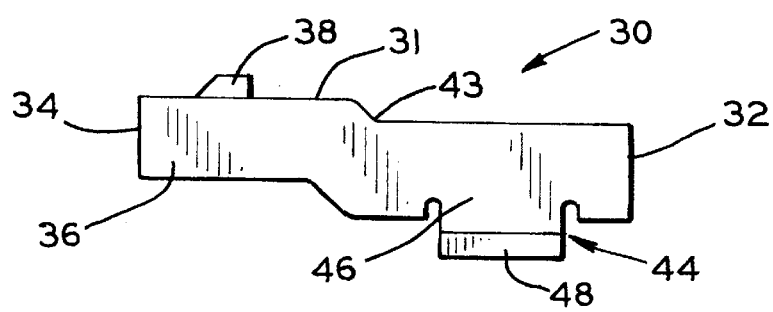
FIG. 3 is a side view of the electrical connector of FIG. 2A.

FIG. 3 is a side view of electrical connector 30. Housing 31 includes a bend 43 that separates first terminal portion 36 from first end 32 and enables electrical connector 30 to easily mate with second electrical connector 60 (see FIG. 9). A pair of mounting structures 44 are located adjacent first end 32. Mounting structure 44 comprises a snap fit tab 46 having a wedge-shaped engaging surface 48. Snap fit tab 46 is resilient and returns to its original configuration after being deformed. Preferably, housing 31 is formed from a plastic material, and most preferably it is an injection molded plastic.

Figure 4:
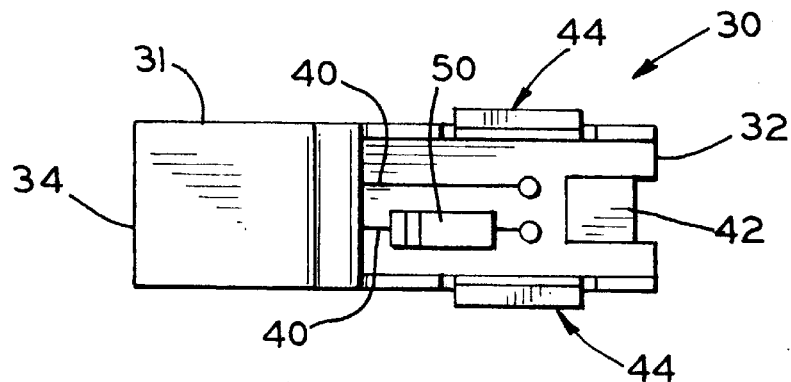
FIG. 4 is a bottom plan view of the electrical connector of FIG. 2A.

FIG. 4 is a bottom plan view of electrical connector 30. A resistor 50 is mounted adjacent first end 32 of housing 31. One of electrical lines 40 extends from light emitting source 42 through resistor 50. Electrical lines 40 extend from light emitting source 42 into first terminal portion 36. Electrical lines 40, light emitting source 42, and resistor 50 are part of electrical circuit 20 and can either be insert molded into housing 31 or plated onto housing 31. In either case, electric lines 40, light emitting source 42, and resistor 50 are secured to housing 31.

Figure 5:
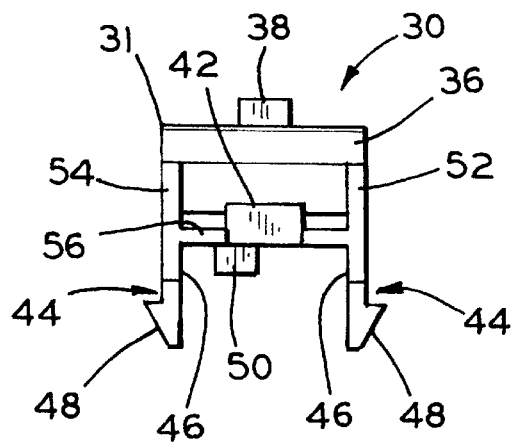
FIG. 5 is a first end view of the electrical connector of FIG. 2A.

FIG. 5 is an end view of first end 32 of electrical connector 30. First end 32 comprises a first wall 52 opposite a second wall 54. First wall 52 and second wall 54 are secured to a third wall 56. Preferably, third wall 56 is perpendicular to first wall 52 and second wall 54. In a preferred embodiment, light emitting source 42 is mounted to third wall 56 as is resistor 50. Snap fit tabs 46 extend from first wall 52 and second wall 54. Housing 31 may include more than two snap fit tabs 46.

Figure 6:
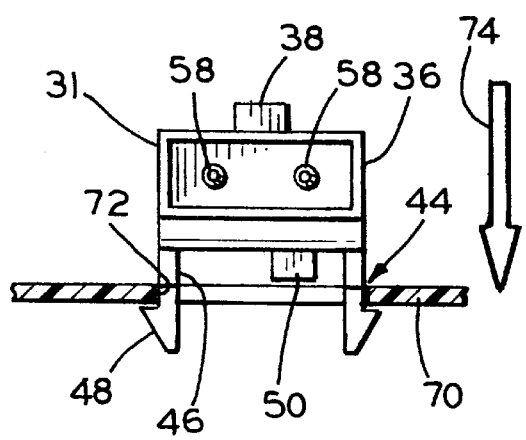
FIG. 6 is a second end view of the electrical connector of FIG. 2A mounted to a surface.

FIG. 6 is a view of second end 34 of electrical connector 30 secured to a surface 70. Surface 70 includes an aperture 72 wherein the aperture 72 has a width substantially equal to the distance between the outer surfaces of first wall 52 and second wall 54. Mounting structure 44 permits electrical connector 30 to be secured within aperture 72 of surface 70. In practice, snap fit tabs 46 are inserted into aperture 72. As electrical connector 30 is initially pushed in the direction of arrow 74, snap fit tabs 46 are deformed toward each other. As electrical connector 30 is pushed further in the direction of arrow 74 wedge-shaped engaging surfaces 48 pass through aperture 72. Once wedge-shaped engaging surfaces 48 pass completely through aperture 72, snap fit tabs 46 spring back to a rest position and wedge-shaped engaging surfaces 48 engage surface 70 to secure housing 31 to surface 70.

First terminal portion 36 preferably includes a pair of male terminals 58. As will be understood by one of ordinary skill in the art, first terminal portion 36 could include a pair of female terminals rather than male terminals 58. Optionally, first terminal portion 36 could also comprise a pair of plated plastic terminals. Thus, electrical circuit 20 comprises male terminals 58, electrical lines 40, resistor 50, and light emitting source 42. As discussed above, electrical circuit 20 is either insert molded or plated to housing 31.

Figure 7:
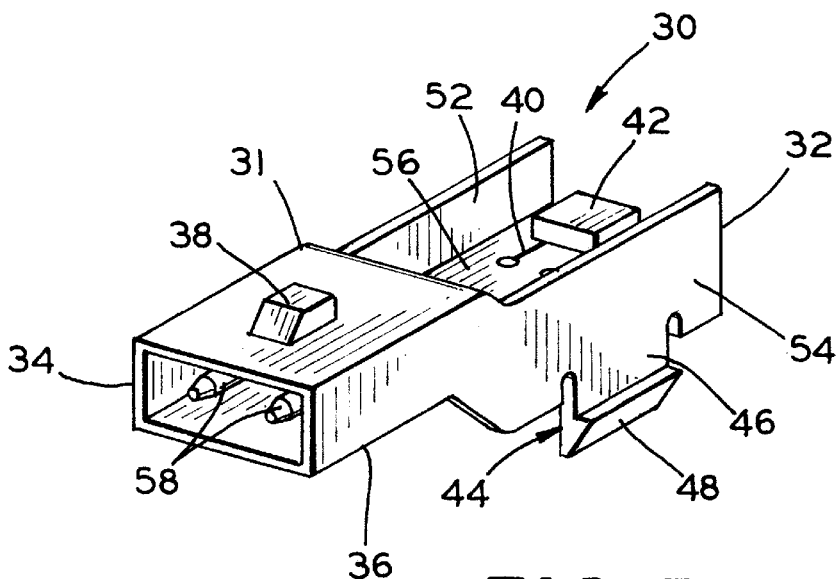
FIG. 7 is a side perspective view of the electrical connector of FIG. 2A.

FIG. 7 is a side perspective view of electrical connector 30. As discussed above, light emitting source 42 is preferably a light emitting diode. Light emitting source 42 can be designed to emit light in any direction.

Figure 8A:
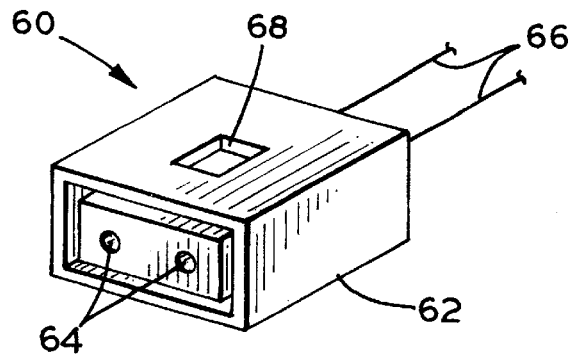
FIG. 8A is a partial side perspective view of a first embodiment of a second electrical connector that is mateable with the electrical connector shown in FIG. 2A.

FIG. 8A is a partial side perspective view of a first embodiment of a second electrical connector 60. Second electrical connector 60 is mateable with electrical connector 30 shown in FIG. 2A. Specifically, second electrical connector 60 includes a second terminal portion 62 having a pair of female terminals 64. Female terminals 64 are connected to electrical lines 66, which are connected to an electrical power source (not shown) and which supply electrical power to female terminals 64. Second electrical connector 60 further includes a second latching member 68 for engaging first latching member 38 and securing electrical connector 30 to second electrical connector 60. Second latching member 68 comprises a hole.

Figure 8B:
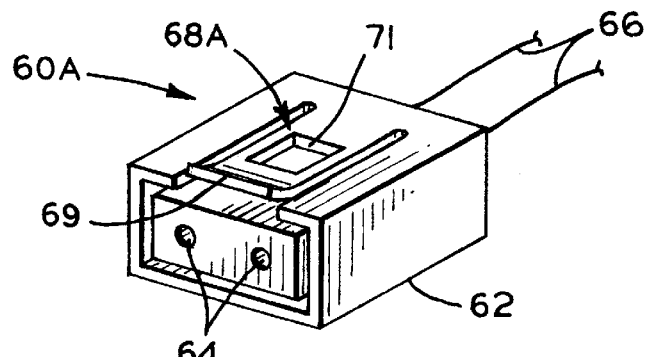
FIG. 8B is a partial side perspective view of another embodiment of a second electrical connector that is mateable with the electrical connector shown in FIG. 2A.

FIG. 8B is a partial side perspective view of another embodiment of a second electrical connector 60. Second electrical connector 60 as shown in FIG. 8B is mateable with electrical connector 30 shown in FIG. 2A. Like parts are designated by the same reference numerals in FIGS. 8A and 8B. The second electrical connector 60 as shown in FIG. 8b differs from FIG. 8A only in the structure of a second latching member 68A. Second latching member 68A comprises a cantilevered flexible finger 69 having an aperture 71 for receiving first latching member 38 when first latching member 38 comprises a boss, as shown in FIG. 2A. The embodiment of second latching member 68A shown in FIG. 8B provides for easier assembly and release of electrical connector 30 with second electrical connector 60 as compared to the embodiment shown in FIG. 8A.

Figure 8C:
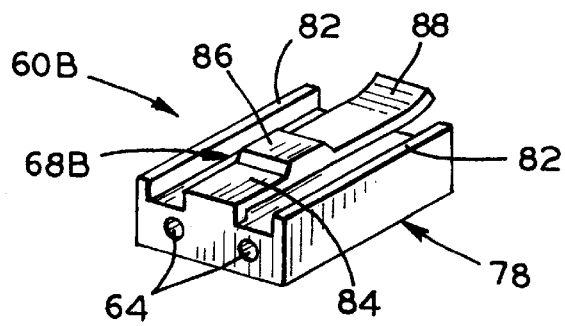
FIG. 8C is a partial side perspective view of an embodiment of a second electrical connector that is mateable with the electrical connector shown in FIG. 2B.

FIG. 8C is a partial side perspective view of an embodiment of a second electrical connector 60B that is matable with the electrical connector 30 as shown in FIG. 2B. Second electrical connector 60B comprises a housing 78 having female terminals 64 and a pair of raised walls 82. Female terminals 64 engage male terminals 58. Second electrical connector 60B further includes a second latching member 68B located between raised walls 82. Second latching member 68B comprises a cantilevered flexible finger 84 that is attached to housing 78. Flexible finger 84 includes a projection 86 and a release tab 88. In use, second electrical connector 60B is inserted into first terminal portion 36 and female terminals 64 receive male terminals 58. Second latching member 68B engages first latching member 38A when projection 86 pops through first latching member 38A. Release tab 88 permits second electrical connector 60B to be easily released from electrical connector 30.

Figure 9:
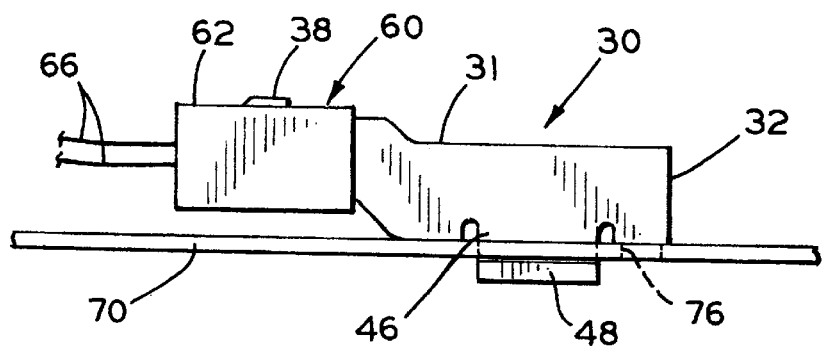
FIG. 9 is a side view of the electrical connector shown in FIG. 6 when it is connected to the second electrical connector shown in FIG. 8A and mounted to the surface.

FIG. 9 is a side view of electrical connector 30 when it is connected to second electrical connector 60 and mounted to surface 70. A second aperture 76, shown in phantom, in surface 70 is aligned with light emitting source 42 when electrical connector 30 is mounted to surface 70. In use, second terminal portion 62 slides around first terminal portion 36 and female terminals 64 receive male terminals 58. First latching member 38 snaps through second latching member 68 in second terminal portion 62 to secure second terminal portion 62 to first terminal portion 36 when electrical connector 30 and second electrical connector 60 are brought together. Snap fit tabs 46 are inserted through aperture 72 to mount electrical connector 30 to the surface 70. Thus, the present invention permits a light to be mounted anywhere that an aperture can be provided in a surface. Advantageously, the second electrical connector 60 and electrical connector 30 are on one side of surface 70 while light emitting source 42 can direct light through second aperture 76 to an area of a vehicle.

As will be understood by one having ordinary skill in the art, second terminal portion 62 could include male terminals while first terminal portion 36 could include female terminals. In all embodiments of electrical connector 30 and second electrical connector 60 the first latching member 38 and second latching member 68 permit the electrical connector 30 and second electrical connector 60 to be releasably secured to each other. In the most preferred embodiment, first latching member 38 is designed as shown in FIG. 2B and second latching member 68 is designed as shown in FIG. 8C.

Thus, in use the electrical connector 30 is secured in a desired location by snap fit tabs 46 being inserted through a surface 70. Then, a second electrical connector 60 is connected to electrical connector 30, as described above, to provide electrical power to electrical circuit 20.

Essentially, the present invention allows a light to be positioned in a small space in a vehicle. The present invention only requires an aperture in a vehicle wall to mount the electrical connector. A simple electrical connection is all that is required to supply power to the light. Thus, the complexity of the prior art light system is greatly reduced.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A light emitting electrical connector comprising:

a housing having a first terminal portion and a mounting structure, said mounting structure for securing said housing to a surface and said first terminal portion mateable with a second terminal portion of a second electrical connector;

said mounting structure comprising at least two resilient snap fit tabs, each of said resilient snap fit tabs extending from said housing and including a wedge-shaped engaging surface, each of said wedge-shaped engaging surfaces for engaging the surface, said resilient snap fit tabs thereby securing said housing to the surface;

an electrical circuit including a light emitting source; and said electric circuit is plated to said housing.

2. A light emitting electrical connector comprising:

a housing having a first terminal portion and a mounting structure, said mounting structure for securing said housing to a surface and said first terminal portion mateable with a second terminal portion of a second electrical connector;

said second terminal portion and said first terminal portion both located on the same side of the surface when said second terminal portion is mated to said first terminal portion;

an electrical circuit including a light emitting diode; and said electric circuit is plated to said housing.

3. A light emitting electrical connector comprising:

a housing having a first terminal portion, a mounting structure for securing said housing to a surface, and a second terminal portion, said first terminal portion mateable with said second terminal portion, said first terminal portion and said second terminal portion both located on the same side of the surface when said second terminal portion is mated to said first terminal portion, said mounting structure having at least two snap fit tabs, each of said snap fit tabs extending from said housing through an aperture in the surface and including a wedge-shaped engaging surface, each of said wedge-shaped engaging surfaces for engaging the surface, said snap fit tabs thereby securing said housing to the surface, said snap fit tabs located opposite each other and adjacent a first end of said housing, said first terminal portion located at a second end of said housing opposite said first end, said first end of said housing includes a first wall opposite a second wall, said first wall and said second wall secured to a third wall, said third wall being substantially perpendicular to said first wall and said second wall, said labs extending from said first wall and said second wall; and an electrical circuit including a light emitting diode, said electrical circuit mounted to said housing, said light emitting diode mounted to said third wall.

* * * * *